United States Patent
Yamamoto

(10) Patent No.: US 12,503,084 B2
(45) Date of Patent: Dec. 23, 2025

(54) CONTROLLER AND CONTROL METHOD

(71) Applicant: Robert Bosch GmbH, Stuttgart (DE)

(72) Inventor: Naoyuki Yamamoto, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/709,115

(22) PCT Filed: Oct. 27, 2022

(86) PCT No.: PCT/IB2022/060333
§ 371 (c)(1),
(2) Date: May 10, 2024

(87) PCT Pub. No.: WO2023/094914
PCT Pub. Date: Jun. 1, 2023

(65) Prior Publication Data
US 2025/0001984 A1    Jan. 2, 2025

(30) Foreign Application Priority Data

Nov. 23, 2021    (JP) .................................. 2021-189769

(51) Int. Cl.
*B60T 7/12* (2006.01)
*B60T 8/17* (2006.01)
(Continued)

(52) U.S. Cl.
CPC .............. *B60T 7/12* (2013.01); *B60T 8/1706* (2013.01); *B60T 8/171* (2013.01); *B60T 8/172* (2013.01);
(Continued)

(58) Field of Classification Search
CPC .......... B60T 7/12; B60T 8/1706; B60T 8/171; B60T 8/172; B60T 2210/20; B60T 2201/06
See application file for complete search history.

(56) References Cited

U.S. PATENT DOCUMENTS 8,170,765 B2 *   5/2012   Woywod ......... B60W 30/18027
                                                              701/70
9,809,222 B2 *  11/2017   Kaneta .................. B60T 8/1706
(Continued)

FOREIGN PATENT DOCUMENTS

EP            2128472 A1    12/2009
JP         2009116882 A     5/2009
(Continued)

OTHER PUBLICATIONS

International Search Report and Written Opinion for Application No. PCT/IB2022/060333 dated Feb. 13, 2023 (6 pages).

*Primary Examiner* — Huan Le
(74) *Attorney, Agent, or Firm* — Michael Best & Friedrich LLP

(57) ABSTRACT

A control method capable of improving operability of a motorcycle. In a controller and the control method according to the present invention, an execution section of the controller executes holding control for braking and holding a motorcycle without relying on a brake operation by a rider of the motorcycle at a stop of the motorcycle. The execution section switches a cancellation condition of the holding control between a first condition, under which the holding control is canceled on the basis of an output increase index value of a drive source (an engine) and connection state information of a clutch, and a second condition, under which the holding control is canceled not on the basis of the output increase index value but on the basis of the connection state information, according to a gradient of a road surface.

10 Claims, 3 Drawing Sheets

(51) Int. Cl.
*B60T 8/171* (2006.01)
*B60T 8/172* (2006.01)
(52) U.S. Cl.
CPC ....... *B60T 2210/20* (2013.01); *B60T 2250/00* (2013.01); *B60T 2260/00* (2013.01)

(56) References Cited

U.S. PATENT DOCUMENTS

| 10,569,756 | B2* | 2/2020 | Tetsuka | ................ | B60W 10/02 |
| 2021/0162964 | A1* | 6/2021 | Nemoto | ................ | B60T 8/3225 |

FOREIGN PATENT DOCUMENTS

| JP | 2018134991 A | 8/2018 |
| WO | 2015067508 A1 | 5/2015 |
| WO | 2018172871 A1 | 9/2018 |

* cited by examiner

[FIG. 1]
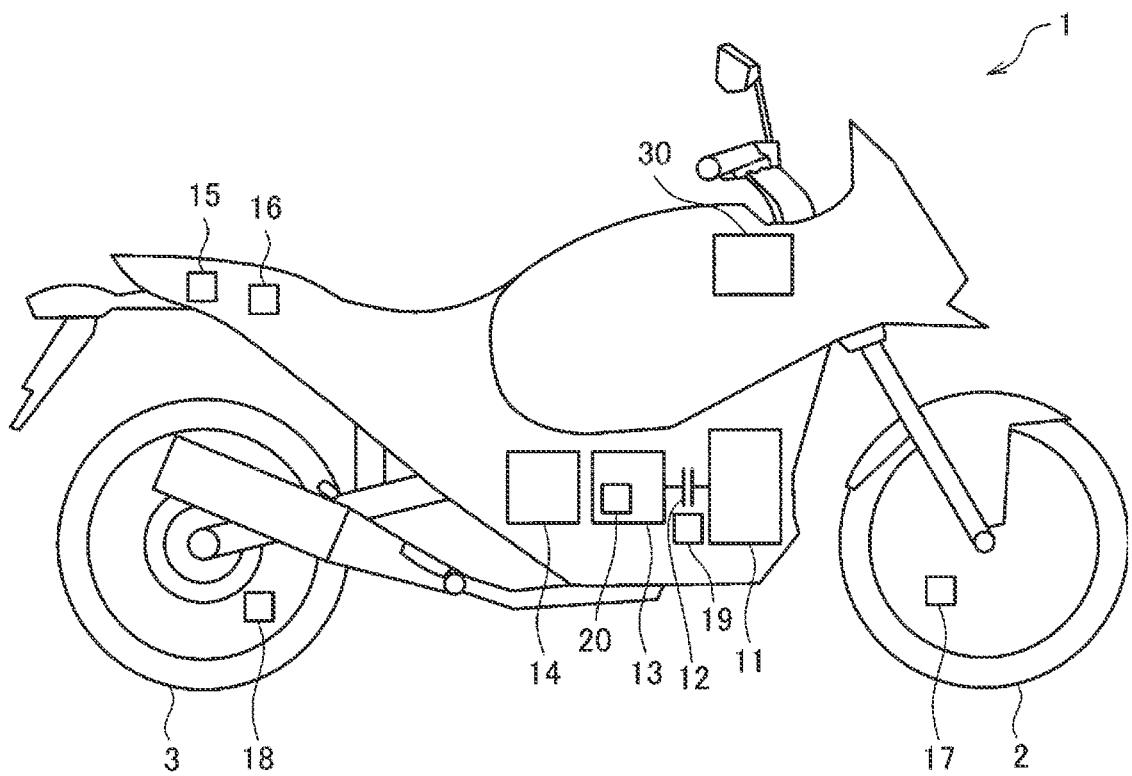
[FIG. 2]
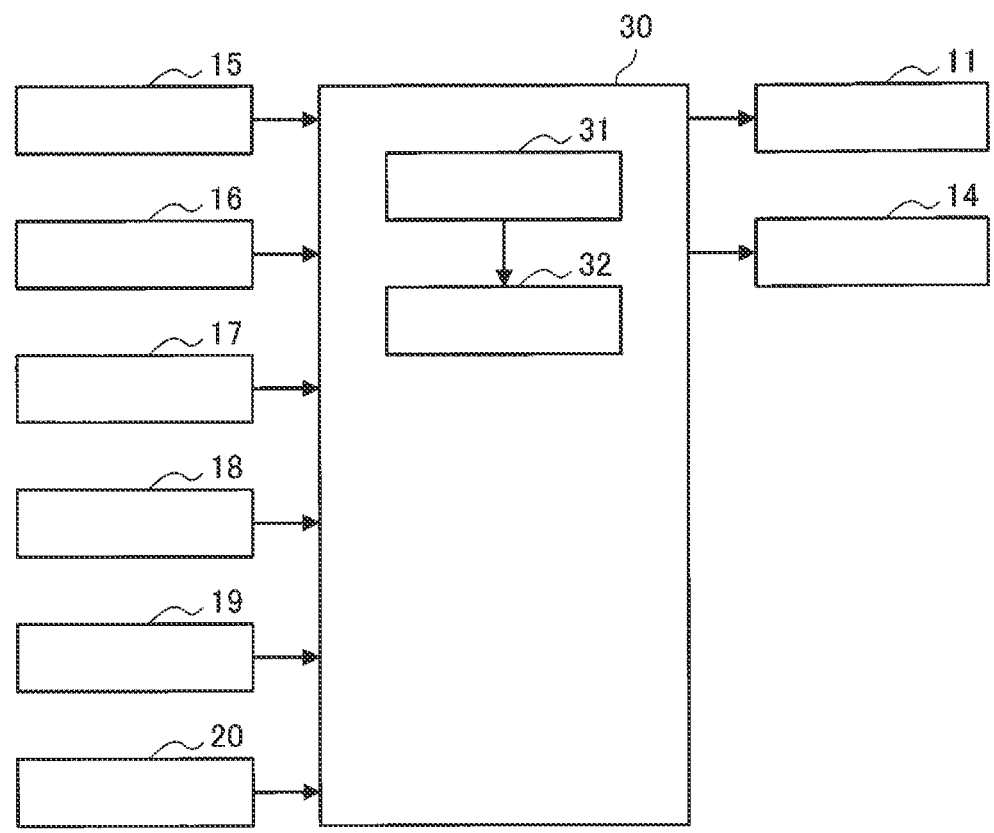

[FIG. 3]
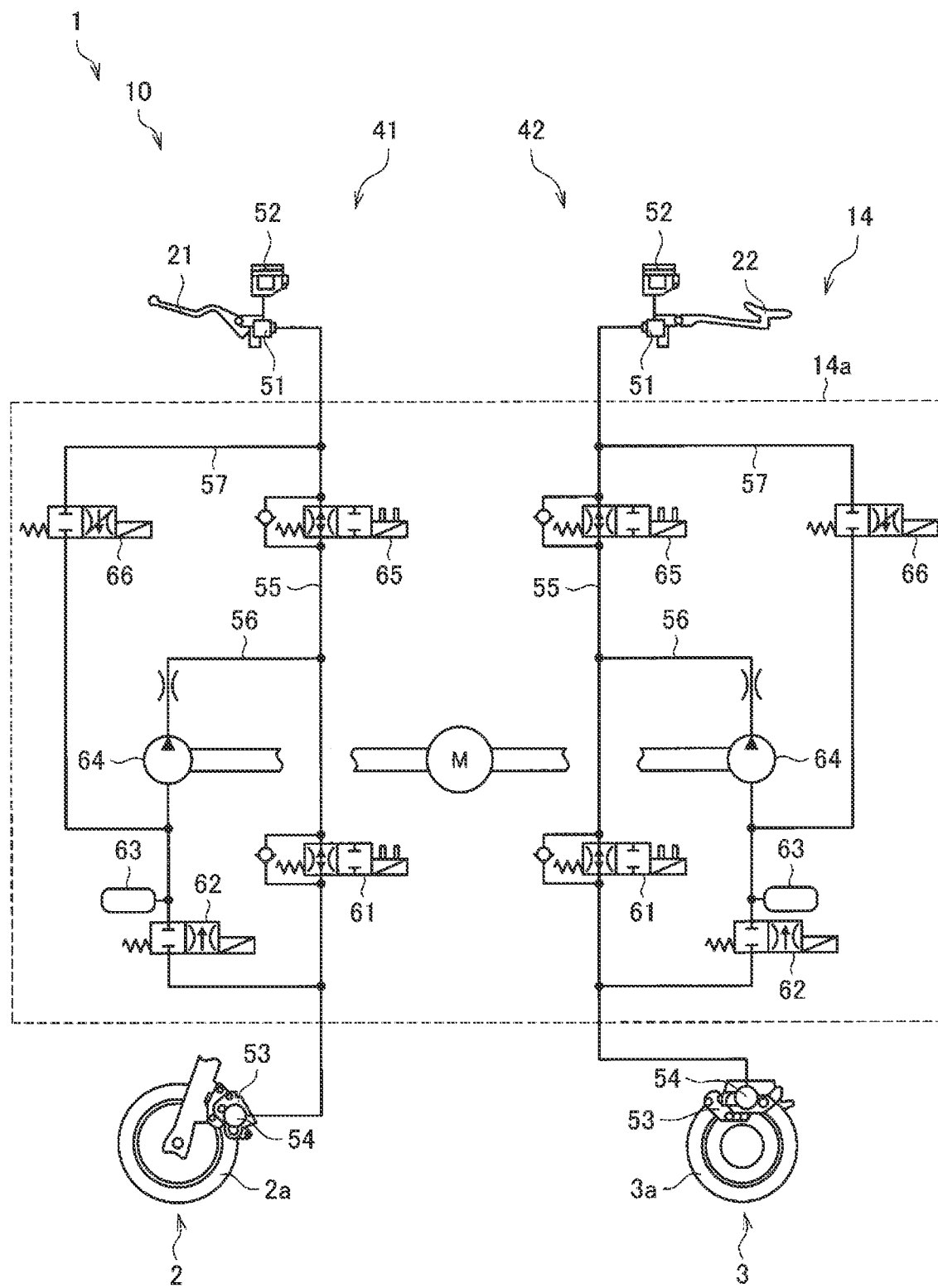

[FIG. 4]
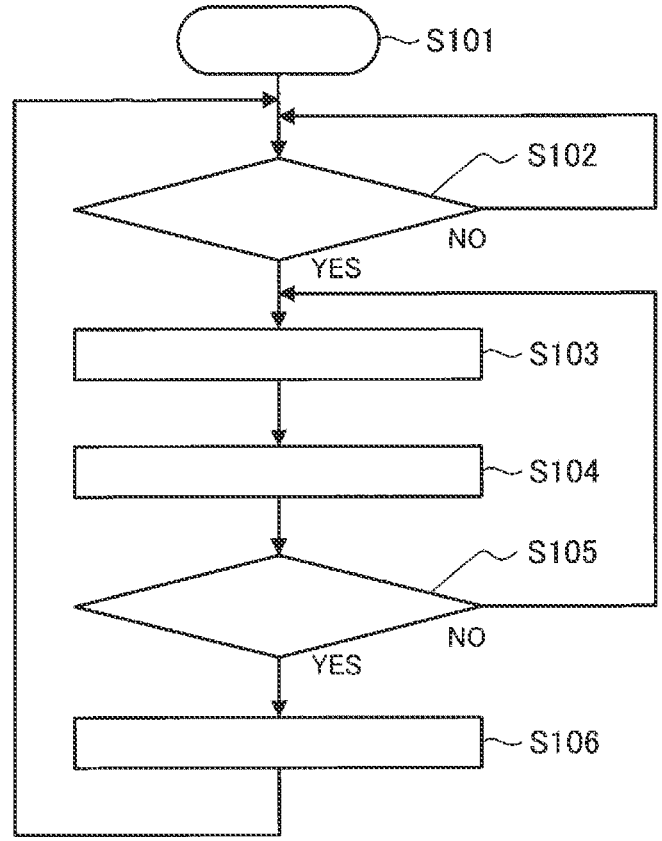
[FIG. 5]
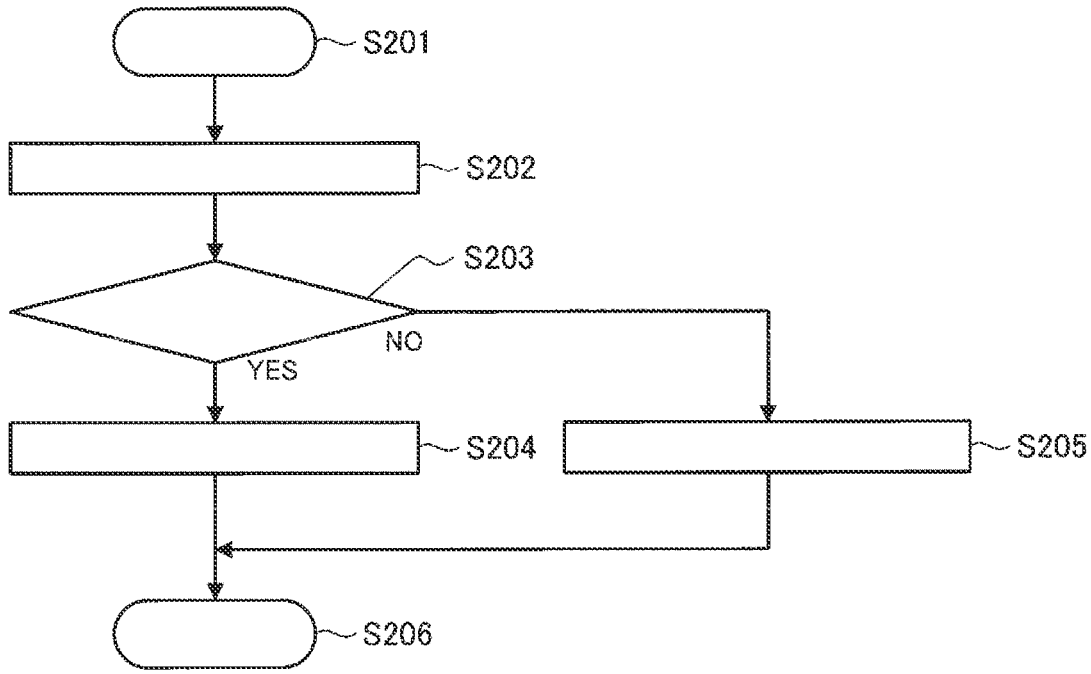

CONTROLLER AND CONTROL METHOD

BACKGROUND

The present disclosure relates to a controller and a control method capable of improving operability of a motorcycle.

As a conventional technique related to a motorcycle, a technique of assisting with driving by a rider has been available. For example, a driver-assistance system is disclosed in JP2009-116882A. The driver-assistance system warns the rider of the motorcycle that the motorcycle inappropriately approaches an obstacle on the basis of information detected by a sensor device that detects the obstacle present in a travel direction or substantially in the travel direction.

SUMMARY

By the way, as a technique of assisting with driving, holding control for braking and holding a vehicle without relying on a brake operation by a driver at a stop of the vehicle has been available. For example, the holding control can be applied to the motorcycle. However, unlike an automobile having four wheels, the motorcycle cannot stand on its own in a stopped state. Thus, when the motorcycle is stopped, the rider has to support a vehicle body thereof with his/her feet. For this reason, operation at the time of canceling the holding control for the motorcycle tends to be complicated. Therefore, it is desired to improve operability.

The present invention has been made with the above-described problem as the background and therefore obtains a controller and a control method capable of improving operability of a motorcycle.

A controller according to the present invention is a controller for controlling behavior of a motorcycle that includes: a drive source; a transmission that is connected to the drive source via a clutch; and a drive wheel that is connected to the transmission, and includes an execution section that executes holding control for braking and holding the motorcycle without relying on a brake operation by a rider of the motorcycle at a stop of the motorcycle. The execution section switches a cancellation condition of the holding control between a first condition and a second condition according to a gradient of a road surface. Under the first condition, the holding control is canceled on the basis of an output increase index value of the drive source and a connection state information of the clutch. Under the second condition, the holding control is canceled not on the basis of the output increase index value but on the basis of the connection state information.

A control method according to the present invention is a control method for behavior of a motorcycle that includes: a drive source; a transmission that is connected to the drive source via a clutch; and a drive wheel that is connected to the transmission, and includes executing, by an execution section of a controller, holding control for braking and holding the motorcycle without relying on a brake operation by a rider of the motorcycle at a stop of the motorcycle. The execution section switches a cancellation condition of the holding control between a first condition and a second condition according to a gradient of a road surface. Under the first condition, the holding control is canceled on the basis of an output increase index value of the drive source and a connection state information of the clutch. Under the second condition, the holding control is canceled not on the basis of the output increase index value but on the basis of the connection state information.

In the controller and the control method according to the present invention, the execution section of the controller executes the holding control for braking and holding the motorcycle without relying on the brake operation by the rider of the motorcycle at the stop of the motorcycle. The execution section switches the cancellation condition of the holding control between the first condition, under which the holding control is canceled on the basis of the output increase index value of the drive source and the connection state information of the clutch, and the second condition, under which the holding control is canceled not on the basis of the output increase index value but on the basis of the connection state information, according to the gradient of the road surface. Just as described, since not only the first condition but also the second condition are applied as the cancellation conditions of the holding control, it is possible to simplify an operation at the time of canceling the holding control of the motorcycle. Therefore, it is possible to improve operability of the motorcycle.

BRIEF DESCRIPTION OF THE DRAWINGS

FIG. 1 is a schematic view illustrating an outline configuration of a motorcycle according to an embodiment of the present invention.

FIG. 2 is a block diagram illustrating an exemplary functional configuration of a controller according to the embodiment of the present invention.

FIG. 3 is a schematic view illustrating an outline configuration of a brake system of the motorcycle according to the embodiment of the present invention.

FIG. 4 is a flowchart illustrating an example of an overall processing procedure that is executed by the controller according to the embodiment of the present invention.

FIG. 5 is a flowchart illustrating an example of a procedure for setting processing for a cancellation condition of holding control among processing executed by the controller according to the embodiment of the present invention.

DETAILED DESCRIPTION

A description will hereinafter be made on a controller according to the present invention with reference to the drawings.

A description will hereinafter be made on a controller that is used for a two-wheeled motorcycle that has an engine as a drive source (see a motorcycle 1 in FIG. 1). However, a vehicle as a control target by the controller according to the present invention only needs to be a motorcycle, and may be a motorcycle other than the motorcycle 1, which will be described below. The motorcycles include a three-wheeled vehicle, for example. The motorcycles include a vehicle having an electric motor as a drive source, a vehicle having plural types of drive sources, and the like, for example. Examples of the motorcycles are a motorbike, a scooter, and an electric scooter.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Motorcycle>

A description will be made on a configuration of the motorcycle 1 according to an embodiment of the present invention with reference to FIG. 1 to FIG. 3.

FIG. 1 is a schematic view illustrating an outline configuration of the motorcycle 1. FIG. 2 is a block diagram illustrating an exemplary functional configuration of a controller 30.

The motorcycle 1 is a two-wheeled motorcycle that corresponds to an example of the motorcycle according to the present invention. As illustrated in FIG. 1, the motorcycle 1 includes a front wheel 2, a rear wheel 3, an engine 11, a clutch 12, a transmission 13, a hydraulic pressure control unit 14, an inertial measurement unit (IMU) 15, a seating sensor 16, a front-wheel rotational frequency sensor 17, a rear-wheel rotational frequency sensor 18, a clutch sensor 19, a gear position sensor 20, and the controller (ECU) 30.

The engine 11 corresponds to an example of a drive source of the motorcycle 1, and can output power for driving the rear wheel 3 as the drive wheel. For example, the engine 11 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount to the combustion chamber varies according to a throttle opening amount as an opening amount of the throttle valve.

The clutch 12 is interposed between the engine 11 and the transmission 13, and connects the engine 11 and the transmission 13. That is, the transmission 13 is connected to the engine 11 via the clutch 12. The clutch 12 allows/disallows power transmission from the engine 11 to the transmission 13. When the clutch 12 is in an engaged state, the power can be transmitted from the engine 11 to the transmission 13. When the clutch 12 is in a disengaged state, the power cannot be transmitted from the engine 11 to the transmission 13. A rider can bring the clutch 12 into the disengaged state by performing a clutch operation using a clutch operation section that is an operation section for operating the clutch 12.

The transmission 13 has plural gear stages. An input shaft of the transmission 13 is connected to the crankshaft of the engine 11 via the clutch 12. An output shaft of the transmission 13 is connected to the rear wheel 3 as the drive wheel. Accordingly, the power that is output from the engine 11 is transmitted to the transmission 13 via the clutch 12, is shifted by the transmission 13, and is then transmitted to the rear wheel 3. The rider can make a shift change by performing a gear shift operation in a state where the clutch 12 is brought into the disengaged state by the clutch operation.

The hydraulic pressure control unit 14 is a unit that has a function of controlling a braking force generated on the wheel. For example, the hydraulic pressure control unit 14 includes components (for example, a control valve and a pump) that are provided on an oil channel connecting a master cylinder and a wheel cylinder and that control a brake hydraulic pressure in the wheel cylinder. By controlling operation of the components of the hydraulic pressure control unit 14, the braking force generated on the wheel is controlled. A detailed description on a brake system that includes the hydraulic pressure control unit 14 will be made below.

The inertial measurement unit 15 includes a three-axis gyroscope sensor and a three-directional acceleration sensor, and detects a posture of the motorcycle 1. The inertial measurement unit 15 is provided to a trunk of the motorcycle 1, for example. For example, the inertial measurement unit 15 detects a pitch angle of the motorcycle 1, and outputs a detection result. The inertial measurement unit 15 may detect another physical quantity that can substantially be converted to the pitch angle of the motorcycle 1. The pitch angle corresponds to an angle representing a tilt in a vertical direction of a body (more specifically, the trunk) of the motorcycle 1 with respect to a horizontal direction. In other words, the pitch angle corresponds to an angle that represents how much the body of the motorcycle 1 rotates from the posture facing the horizontal direction in a pitch direction as a rotational direction with an axis in a vehicle right-left direction being a center. The inertial measurement unit 15 may only include parts of the three-axis gyroscope sensor and the three-directional acceleration sensor.

The seating sensor 16 is provided to a rear seat of the motorcycle 1 and detects presence or absence of an occupant or a loaded article on the rear seat. The presence or the absence of the occupant on the rear seat corresponds to an example of occupant information of the motorcycle 1. Here, the occupant information only needs to be information on the occupant of the motorcycle 1, and can include information on the number of the occupants of the motorcycle 1, weight of each of the occupants, and the like, for example. The presence or the absence of the loaded article on the rear seat corresponds to an example of loaded article information of the motorcycle 1. However, the loaded article information only needs to be information on the loaded article of the motorcycle 1, and can include information on the number of the loaded articles of the motorcycle 1, weight of each of the loaded articles, and the like, for example. That is, the seating sensor 16 corresponds to an example of a sensor that detects the occupant information and the loaded article information of the motorcycle 1. However, the occupant information or the loaded article information of the motorcycle 1 may be detected by a sensor (for example, a camera or the like) other than the seating sensor 16.

The front-wheel rotational frequency sensor 17 is a wheel rotational frequency sensor that detects a rotational frequency of the front wheel 2 (for example, a rotational frequency of the front wheel 2 per unit time [rpm], a travel distance of the front wheel 2 per unit time [km/h], or the like), and outputs a detection result. The front-wheel rotational frequency sensor 17 may detect another physical quantity that can substantially be converted to the rotational frequency of the front wheel 2. The front-wheel rotational frequency sensor 17 is provided to the front wheel 2.

The rear-wheel rotational frequency sensor 18 is a wheel rotational frequency sensor that detects a rotational frequency of the rear wheel 3 (for example, the rotational frequency of the rear wheel 3 per unit time [rpm], a travel distance of the rear wheel 3 per unit time [km/h], or the like), and outputs a detection result. The rear-wheel rotational frequency sensor 18 may detect another physical quantity that can substantially be converted to the rotational frequency of the rear wheel 3. The rear-wheel rotational frequency sensor 18 is provided to the rear wheel 3.

The clutch sensor 19 detects a connection state of the clutch 12, and outputs a detection result. Examples of the connection state of the clutch 12 are the engaged state where the clutch 12 is engaged, the disengaged state where the clutch 12 is disengaged, and a half-clutch state where the clutch 12 is in a state between the engaged state and the disengaged state. When the clutch 12 is in the half-clutch state, the power that is output from the engine 11 is only partially transmitted to the transmission 13. The clutch sensor 19 is provided to the clutch 12, for example.

The gear position sensor 20 detects at which gear stage the gear stage of the transmission 13 is set, and outputs a detection result. The gear position sensor 20 is provided to the transmission 13, for example.

The controller 30 controls behavior of the motorcycle 1. For example, the controller 30 is partially or entirely constructed of a microcomputer, a microprocessor unit, or the like. In addition, the controller 30 may partially or entirely be constructed of one whose firmware and the like can be updated, or may partially or entirely be a program module or the like that is executed by a command from a CPU or the like, for example. The controller 30 may be provided as one unit or may be divided into plural units, for example.

As illustrated in FIG. 2, the controller 30 includes an acquisition section 31 and an execution section 32, for example. In addition, the controller 30 communicates with each of devices in the motorcycle 1.

The acquisition section 31 acquires information from each of the devices in the motorcycle 1, and outputs the acquired information to the execution section 32. For example, the acquisition section 31 acquires information from the inertial measurement unit 15, the seating sensor 16, the front-wheel rotational frequency sensor 17, the rear-wheel rotational frequency sensor 18, the clutch sensor 19, and the gear position sensor 20. In the present specification, the acquisition of the information can include extraction, generation, and the like of the information.

The execution section 32 executes various types of control by controlling operation of each of the devices in the motorcycle 1. For example, the execution section 32 controls the operation of the engine 11 and the hydraulic pressure control unit 14.

A description will herein be made on an outline configuration of a brake system 10 for the motorcycle 1 and control for the braking force generated to the motorcycle 1 with reference to FIG. 3. FIG. 3 is a schematic view illustrating the outline configuration of the brake system 10 for the motorcycle 1. As illustrated in FIG. 3, the brake system 10 has a first brake operation section 21 and a second brake operation section 22. The first brake operation section 21 is a brake lever, for example. The second brake operation section 22 is a brake pedal, for example. The brake system 10 includes: a front-wheel brake mechanism 41 that brakes the front wheel 2 in an interlocking manner with at least the first brake operation section 21; and a rear-wheel brake mechanism 42 that brakes the rear wheel 3 in an interlocking manner with at least the second brake operation section 22. The brake system 10 also includes the hydraulic pressure control unit 14, and the front-wheel brake mechanism 41 and the rear-wheel brake mechanism 42 are partially included in the hydraulic pressure control unit 14.

Each of the front-wheel brake mechanism 41 and the rear-wheel brake mechanism 42 includes: a master cylinder 51 in which a piston (not illustrated) is installed; a reservoir 52 that is attached to the master cylinder 51; a brake caliper 53 that is held by the trunk of the motorcycle 1 and has a brake pad (not illustrated); a wheel cylinder 54 that is provided to the brake caliper 53; a primary channel 55 through which a brake fluid in the master cylinder 51 flows into the wheel cylinder 54; a secondary channel 56 through which the brake fluid in the wheel cylinder 54 is released; and a supply channel 57 through which the brake fluid in the master cylinder 51 is supplied to the secondary channel 56.

An inlet valve (EV) 61 is provided to the primary channel 55. The secondary channel 56 bypasses a portion of the primary channel 55 between the wheel cylinder 54 side and the master cylinder 51 side of the inlet valve 61. The secondary channel 56 is sequentially provided with an outlet valve (AV) 62, an accumulator 63, and a pump 64 from an upstream side. Between an end on the master cylinder 51 side of the primary channel 55 and a portion of the primary channel 55 to which a downstream end of the secondary channel 56 is connected, a first valve (USV) 65 is provided. The supply channel 57 communicates between the master cylinder 51 and a portion on a suction side of the pump 64 in the secondary channel 56. A second valve (HSV) 66 is provided to the supply channel 57.

The inlet valve 61 is an electromagnetic valve that is opened in an unenergized state and is closed in an energized state, for example. The outlet valve 62 is an electromagnetic valve that is closed in an unenergized state and is opened in an energized state, for example. The first valve 65 is an electromagnetic valve that is opened in an unenergized state and is closed in an energized state, for example. The second valve 66 is an electromagnetic valve that is closed in an unenergized state and is opened in an energized state, for example.

The hydraulic pressure control unit 14 includes: components such as the inlet valves 61, the outlet valves 62, the accumulators 63, the pumps 64, the first valves 65, and the second valves 66 used to control the brake hydraulic pressure; and a base body 14a to which those components are provided and in which channels constituting the primary channels 55, the secondary channels 56, and the supply channels 57 are formed.

The base body 14a may be formed of one member or may be formed of plural members. In addition, in the case where the base body 14a is formed of the plural members, the components may separately be provided to the different members.

The operation of the components in the hydraulic pressure control unit 14 is controlled by the execution section 32 of the controller 30. As a result, the braking force generated on the front wheel 2 by the front-wheel brake mechanism 41 and the braking force generated on the rear wheel 3 by the rear-wheel brake mechanism 42 are controlled.

During normal time (that is, when the braking force corresponding to the brake operation by the rider is set to be generated on the wheel), the controller 30 opens the inlet valve 61, closes the outlet valve 62, opens the first valve 65, and closes the second valve 66. When the first brake operation section 21 is operated in such a state, in the front-wheel brake mechanism 41, the piston (not illustrated) in the master cylinder 51 is pressed to increase the hydraulic pressure of the brake fluid in the wheel cylinder 54, the brake pad (not illustrated) of the brake caliper 53 is then pressed against a rotor 2a of the front wheel 2, and the braking force is thereby generated on the front wheel 2. Meanwhile, when the second brake operation section 22 is operated, in the rear-wheel brake mechanism 42, the piston (not illustrated) in the master cylinder 51 is pressed to increase the hydraulic pressure of the brake fluid in the wheel cylinder 54, the brake pad (not illustrated) of the brake caliper 53 is then pressed against a rotor 3a of the rear wheel 3, and the braking force is thereby generated on the rear wheel 3.

Here, the execution section 32 can execute holding control for braking and holding the motorcycle 1 without relying on the brake operation by the rider of the motorcycle 1 at a stop of the motorcycle 1. In the holding control, for example, the execution section 32 brings the motorcycle 1 into a state where the inlet valve 61 is opened, the outlet valve 62 is closed, the first valve 65 is closed, and the second valve 66 is opened, and drives the pump 64 in such a state. In this way, the execution section 32 increases the hydraulic pressure of the brake fluid in the wheel cylinder 54, and can thereby generate the braking force on the wheel. In this way, the motorcycle 1 is braked and held without relying on the brake operation by the rider. Therefore, advancement or reversing of the motorcycle 1, which is caused by a force such as own weight applied to the motorcycle 1, is suppressed.

In addition, in the holding control, for example, the execution section 32 brings the motorcycle 1 into a state where both of the inlet valve 61 and the outlet valve 62 are closed. In this way, the execution section 32 maintains the hydraulic pressure of the brake fluid in the wheel cylinder 54, and can thereby maintain the braking force generated on the wheel. In addition, for example, in the holding control, the execution section 32 brings the motorcycle 1 into a state where the inlet valve 61 is closed, the outlet valve 62 is opened, the first valve 65 is opened, and the second valve 66 is closed, and drives the pump 64 in such a state. In this way, the execution section 32 reduces the hydraulic pressure of the brake fluid in the wheel cylinder 54, and can thereby reduce the braking force generated on the wheel.

In the holding control, for example, the execution section 32 holds the motorcycle 1 by braking only the rear wheel 3 of the front wheel 2 and the rear wheel 3. However, the wheel that is braked in the holding control is not limited to this example. For example, both of the front wheel 2 and the rear wheel 3 may be braked.

The above description has been made on the example in which the hydraulic pressure control unit 14 controls the braking force generated on each of the front wheel 2 and the rear wheel 3. However, the hydraulic pressure control unit 14 may control the braking force generated on only one of the front wheel 2 and the rear wheel 3.

<Operation of Controller>

A description will be made on operation of the controller 30 according to the embodiment of the present invention with reference to FIG. 4 and FIG. 5.

As described above, the execution section 32 of the controller 30 can execute the holding control for braking and holding the motorcycle 1 without relying on the brake operation by the rider of the motorcycle 1 at the stop of the motorcycle 1. Here, the execution section 32 switches a cancellation condition of the holding control between a first condition and a second condition according to a gradient of a road surface on which the motorcycle 1 travels. For example, the gradient of the road surface can be acquired on the basis of the output result of the inertial measurement unit 15. In this way, as will be described below, operability of the motorcycle 1 can be improved. A detailed description on the first condition and the second condition will be made below.

In the present specification, the gradient of the road surface has a positive value in a case of an uphill road, and has a negative value in a case of a downhill road. In the case of the uphill road, the gradient has the larger value as the gradient of the road surface is increased with respect to the horizontal direction. In the case of the downhill road, the gradient has the smaller value as the gradient of the road surface is increased with respect to the horizontal direction.

FIG. 4 is a flowchart illustrating an example of an overall processing procedure that is executed by the controller 30.

Step S101 in FIG. 4 corresponds to initiation of a control flow illustrated in FIG. 4. When the control flow illustrated in FIG. 4 is initiated, the holding control is not executed.

When the control flow illustrated in FIG. 4 is initiated, in step S102, the execution section 32 determines whether an execution condition of the holding control is satisfied.

The execution condition of the holding control is a condition for determining whether to execute the holding control. As will be described below, the execution section 32 executes the holding control when the execution condition is satisfied. For example, the execution condition is such a condition that the motorcycle 1 is stopped and a specified operation is performed by the rider. The execution section 32 can determine whether the motorcycle 1 is stopped on the basis of a speed of the motorcycle 1. For example, the speed of the motorcycle 1 can be acquired on the basis of the rotational frequency of the front wheel 2 and the rotational frequency of the rear wheel 3. For example, the above specified operation is a temporal brake operation with a specified operation amount or larger.

If it is determined in step S102 that the execution condition of the holding control is not satisfied (step S102/NO), step S102 is repeated. On the other hand, if it is determined in step S102 that the execution condition of the holding control is satisfied (step S102/YES), the processing proceeds to step S103. In step S103, the execution section 32 executes the holding control. In this way, the motorcycle 1 is braked and held without relying on the brake operation by the rider.

Following step S103, in step S104, the execution section 32 sets the cancellation condition of the holding control.

The cancellation condition of the holding control is a condition for determining whether to cancel the holding control. As will be described below, the execution section 32 cancels the holding control when the cancellation condition is satisfied during execution of the holding control. A detailed description on setting processing for the cancellation condition will be made below with reference to FIG. 5.

Following step S104, in step S105, the execution section 32 determines whether the cancellation condition of the holding control is satisfied. As will be described below, in the setting processing for the cancellation condition, the cancellation condition is switched between the first condition and the second condition. In step S105, in the case where the cancellation condition is set to the first condition, the execution section 32 determines whether the first condition is satisfied. On the other hand, in the case where the cancellation condition is set to the second condition, the execution section 32 determines whether the second condition is satisfied.

If it is determined in step S105 that the cancellation condition of the holding control is not satisfied (step S105/NO), the processing returns to step S103. On the other hand, if it is determined in step S105 that the cancellation condition of the holding control is satisfied (step S105/YES), the processing proceeds to step S106. In step S106, the execution section 32 cancels the holding control, and the processing returns to step S102.

When the holding control is canceled in step S106, the execution section 32 gradually reduces the braking force generated to the motorcycle 1, for example. Here, at the time of canceling the holding control, the execution section 32 may change a degree of the reduction in the braking force generated to the motorcycle 1 on the basis of the gradient of the road surface. The degree of the reduction in the braking force includes a reduction gradient of the braking force (that is, a reduced amount of the braking force per unit time), for example.

For example, at the time of canceling the holding control, the execution section 32 determines and controls the degree of the reduction in the braking force generated to the motorcycle 1 on the basis of parameters including engine torque (that is, output of the engine 11). Here, the execution section 32 changes a type of the parameter, which is used to determine the degree of the reduction in the braking force, among the parameters on the basis of the gradient of the road surface (for example, uses the different parameter between the uphill road and the downhill road). In this way, at the time of canceling the holding control, the execution section 32 can change the degree of the reduction in the braking force generated to the motorcycle 1 on the basis of the gradient of the road surface. For example, in the case of the downhill road, the execution section 32 may increase the degree of the reduction in the braking force generated to the motorcycle 1 to be greater than that in the case of the uphill road when canceling the holding control. In this way, it is possible to promptly finish braking the motorcycle 1 and thus to smoothly start the motorcycle 1.

FIG. 5 is a flowchart illustrating an example of a procedure for the setting processing for the cancellation condition of the holding control among the processing executed by the controller 30. A control flow illustrated in FIG. 5 is executed in step S104 in the control flow illustrated in FIG. 4 described above. Step S201 in FIG. 5 corresponds to initiation of the control flow illustrated in FIG. 5. Step S206 in FIG. 5 corresponds to termination of the control flow illustrated in FIG. 5.

When the control flow illustrated in FIG. 5 is initiated, in step S202, the execution section 32 sets a reference gradient. As will be described below, in the case where the gradient of the road surface is greater than the reference gradient, the execution section 32 switches the cancellation condition to the first condition. In the case where the gradient of the road surface is less than the reference gradient, the execution section 32 switches the cancellation condition to the second condition. The reference gradient may be set in advance, or may be changed on the basis of various parameters. For example, as will be described below, the execution section 32 may change the reference gradient on the basis of at least one of the occupant information and the loaded article information of the motorcycle 1.

Following step S202, in step S203, the execution section 32 determines whether the gradient of the road surface is greater than the reference gradient.

If it is determined in step S203 that the gradient of the road surface is greater than the reference gradient (step S203/YES), the processing proceeds to step S204. In step S204, the execution section 32 sets the cancellation condition to the first condition. Then, the control flow illustrated in FIG. 5 is terminated. On the other hand, if it is determined in step S203 that the gradient of the road surface is less than the reference gradient (step S203/NO), the processing proceeds to step S205. In step S205, the execution section 32 sets the cancellation condition to the second condition. Then, the control flow illustrated in FIG. 5 is terminated. Here, in the case where the gradient of the road surface is equal to the reference gradient, the execution section 32 may set the cancellation condition to the first condition or the second condition.

The reference gradient is a gradient that indicates a flat road, for example. In this case, if the road surface is the uphill road, it is determined YES in step S203, and the cancellation condition is set to the first condition. On the other hand, if the road surface is the downhill road, it is determined NO in step S203, and the cancellation condition is set to the second condition. However, the reference gradient may be greater or less than the gradient that indicates the flat road. In addition, as will be described below, the reference gradient may not be a fixed value.

The first condition is a condition that is based on an output increase index value of the drive source (in the above example, the engine 11) and connection state information of the clutch 12. That is, in the case where the cancellation condition is set to the first condition, the holding control is canceled on the basis of the output increase index value and the connection state information of the clutch 12. For example, the first condition is a condition that both of a condition based on the output increase index value and a condition based on the connection state information of the clutch 12 are satisfied. For example, the connection state information of the clutch 12 can be acquired on the basis of the output result of the clutch sensor 19.

The output increase index value is an index value that indicates a degree of an increase in the output of the drive source (in the above example, the engine 11). The output increase index value may be a value that takes into account the output of the drive source (in the above example, the engine 11), or may be a value that takes into account the throttle opening amount of the engine 11. In the case where a controller other than the controller 30 controls the engine 11, the output increase index value can be acquired from the other controller.

For example, as the condition based on the output increase index value in the first condition, such a condition is used that the output of the engine 11 is greater than reference output and the throttle opening amount of the engine 11 is larger than a reference opening amount. For example, the reference output is a degree of the output with which it is possible to start the motorcycle 1 without engine stalling at the time of canceling the holding control. For example, the reference opening amount is an opening amount with which it is possible to determine that the throttle valve of the engine 11 is opened.

As the condition based on the output increase index value in the first condition, only one of the condition that the output of the engine 11 is greater than reference output and the condition that the throttle opening amount of the engine 11 is larger than the reference opening amount may be used.

For example, as the condition based on the connection state information of the clutch 12 in the first condition, such a condition is used that the connection state information of the clutch 12 is information indicating that the clutch 12 is in the engaged state.

As the condition based on the connection state information of the clutch 12 in the first condition, such a condition may be used that the connection state information of the clutch 12 is information indicating that the clutch 12 is in the half-clutch state.

As described above, the first condition only needs to be the condition that is based on the output increase index value and the connection state information of the clutch 12, and may include another condition in addition to the condition based on the output increase index value and the condition based on the connection state information of the clutch 12. For example, the first condition may be a condition that all of the condition based on the output increase index value, the condition based on the connection state information of the clutch 12, and a condition based on gear stage information of the transmission 13 are satisfied. For example, the gear stage information of the transmission 13 can be acquired on the basis of the output result of the gear position sensor 20.

As the condition based on the gear stage information of the transmission 13 in the first condition, for example, a condition that the transmission 13 is not in a neutral state is used.

The second condition is a condition that is not based on the output increase index value but based on the connection state information. That is, in the case where the cancellation condition is set to the second condition, the holding control is canceled not on the basis of the output increase index value but on the basis of the connection state information. For example, the second condition is a condition that the condition based on the connection state information of the clutch 12 is satisfied.

For example, as the condition based on the connection state information of the clutch 12 in the second condition, similar to the condition based on the connection state information of the clutch 12 in the first condition, such a condition is used that the connection state information of the clutch 12 is the information indicating that the clutch 12 is in the engaged state.

However, as the condition based on the connection state information of the clutch 12 in the second condition, similar to the condition based on the connection state information of the clutch 12 in the first condition, such a condition may be used that the connection state information of the clutch 12 is the information indicating that the clutch 12 is in the half-clutch state.

As described above, the second condition only needs to be the condition that is not based on the output increase index value but based on the connection state information of the clutch 12, and may include another condition in addition to the condition based on the connection state information of the clutch 12. For example, the second condition may be a condition that both of the condition based on the connection state information of the clutch 12 and the condition based on the gear stage information of the transmission 13 are satisfied.

As the condition based on the gear stage information of the transmission 13 in the second condition, similar to the condition based on the connection state information of the clutch 12 in the first condition, for example, the condition that the transmission 13 is not in the neutral state is used.

As described above, in this embodiment, the execution section 32 switches the cancellation condition of the holding control between the first condition and the second condition according to the gradient of the road surface. In the first condition, unlike the second condition, the output increase index value is taken into account. Accordingly, since the holding control is canceled under the condition that an accelerator operation is performed in addition to a clutch operation by the rider, the motorcycle 1 can be started without the engine stalling also on the uphill road or the like, for example. On the other hand, in the second condition, unlike the first condition, the output increase index value is not taken into account. Accordingly, even when the accelerator operation is not performed by the rider, the holding control is canceled by performing the clutch operation. Therefore, it is possible to simplify the operation at the time of canceling the holding control.

Here, at a start of the motorcycle 1, likelihood of occurrence of the engine stalling is changed according to the gradient of the road surface. Accordingly, when the cancellation condition of the holding control is switched between the first condition and the second condition according to the gradient of the road surface, on the uphill road or the like on which necessity of suppressing the engine stalling is high, the motorcycle 1 can be started without the engine stalling by using the first condition. Meanwhile, on the flat road, the downhill road, or the like on which the necessity of suppressing the engine stalling is low, the motorcycle 1 can be started without the engine stalling even when the output increase index value is not taken into account. Thus, it is possible to simplify the operation at the time of canceling the holding control by using the second condition. Therefore, it is possible to improve the operability of the motorcycle 1.

In particular, in the control flow illustrated in FIG. 5, in the case where the gradient of the road surface is greater than the reference gradient, the execution section 32 switches the cancellation condition to the first condition. In the case where the gradient of the road surface is less than the reference gradient, the execution section 32 switches the cancellation condition to the second condition. Accordingly, in the case where the gradient of the road surface is greater than the reference gradient and the necessity of suppressing the engine stalling is high, the motorcycle 1 is appropriately started without the engine stalling by using the first condition. On the other hand, in the case where the gradient of the road surface is less than the reference gradient and the necessity of suppressing the engine stalling is low, it is possible to appropriately simplify the operation at the time of canceling the holding control by using the second condition. Therefore, it is possible to appropriately improve the operability of the motorcycle 1.

As described above, the execution section 32 may change the reference gradient on the basis of at least one of the occupant information and the loaded article information of the motorcycle 1. The occupant information and the loaded article information of the motorcycle 1 can be acquired on the basis of the output result of the seating sensor 16, for example. Here, the engine stalling is more likely to occur as the weight of the occupant or the loaded article of the motorcycle 1 is increased.

For example, in the case where the weight of the occupant of the motorcycle 1 is heavy, the execution section 32 reduces the reference gradient to be less than that in the case where the weight of the occupant of the motorcycle 1 is light. For example, in the case where the number of the occupants of the motorcycle 1 is two, the execution section 32 reduces the reference gradient to be less than that in the case where the number of the occupants of the motorcycle 1 is one. In this way, the cancellation condition is easily switched to the first condition. Therefore, the motorcycle 1 is appropriately started without the engine stalling.

For example, in the case where the weight of the loaded article of the motorcycle 1 is heavy, the execution section 32 reduces the reference gradient to be less than that in the case where the weight of the loaded article of the motorcycle 1 is light. For example, in the case where there is the loaded article of the motorcycle 1, the execution section 32 reduces the reference gradient to be less than that in the case where there is no loaded article of the motorcycle 1. In this way, the cancellation condition is easily switched to the first condition. Therefore, the motorcycle 1 is appropriately started without the engine stalling.

<Effects of Controller>

A description will be made on effects of the controller 30 according to the embodiment of the present invention.

In the controller 30, the execution section 32 switches the cancellation condition of the holding control between the first condition, under which the holding control is canceled on the basis of the output increase index value of the drive source (in the above example, the engine 11) and the connection state information of the clutch 12, and the second condition, under which the holding control is canceled not on the basis of the output increase index value but on the basis of the connection state information, according to the gradient of the road surface. Just as described, not only the first condition but also the second condition are applied as the cancellation conditions of the holding control. In this way, on the uphill road or the like on which the necessity of suppressing the engine stalling is high, the motorcycle 1 can be started without the engine stalling by using the first condition. Meanwhile, on the flat road, the downhill road, or the like on which the necessity of suppressing the engine stalling is low, the motorcycle 1 can be started without the engine stalling even when the output increase index value is not taken into account. Thus, it is possible to simplify the operation at the time of canceling the holding control by using the second condition. Therefore, it is possible to improve the operability of the motorcycle 1.

Preferably, in the controller 30, in the case where the gradient of the road surface is greater than the reference gradient, the execution section 32 switches the cancellation condition to the first condition. In the case where the gradient of the road surface is less than the reference gradient, the execution section 32 switches the cancellation condition to the second condition. Accordingly, in the case where the gradient of the road surface is greater than the reference gradient and the necessity of suppressing the engine stalling is high, the motorcycle 1 is appropriately started without the engine stalling by using the first condition. On the other hand, in the case where the gradient of the road surface is less than the reference gradient and the necessity of suppressing the engine stalling is low, it is possible to appropriately simplify the operation at the time of canceling the holding control by using the second condition. Therefore, it is possible to appropriately improve the operability of the motorcycle 1.

Preferably, in the controller 30, the execution section 32 changes the reference gradient on the basis of at least one of the occupant information and the loaded article information of the motorcycle 1. In this way, it is possible to change the reference gradient according to the weight of the occupant or the loaded article of the motorcycle 1. Accordingly, it is possible to change the reference gradient according to the likeliness of the occurrence of the engine stalling. Therefore, the motorcycle 1 is appropriately started without the engine stalling.

Preferably, in the controller 30, the second condition includes the condition that the connection state information of the clutch 12 is the information indicating that the clutch 12 is in the engaged state. In this way, in the case where the cancellation condition is set to the second condition, the holding control can be canceled at timing at which the rider has an intention to start and at which it is expected that the accelerator operation is performed by the rider in the near future. More specifically, in the case where the rider brings the clutch 12 into the engaged state at the start, it is possible to appropriately cancel the holding control.

Preferably, in the controller 30, the second condition includes the condition that the connection state information of the clutch 12 is the information indicating that the clutch 12 is in the half-clutch state. In this way, in the case where the cancellation condition is set to the second condition, the holding control can be canceled at the timing at which the rider has the intention to start and at which it is expected that the accelerator operation is performed by the rider in the near future. More specifically, in the case where the rider brings the clutch 12 into the half-clutch state at the start, it is possible to appropriately cancel the holding control.

Preferably, in the controller 30, the second condition includes the condition that the transmission 13 is not in the neutral state. In this way, even in the case where the clutch 12 is brought into the engaged state or the half-clutch state, the cancellation of the holding control can be suppressed when the transmission 13 is in the neutral state. For example, it is possible to suppress the cancellation of the holding control in a situation where the rider idles the engine 11, or the like.

Preferably, in the controller 30, at the time of canceling the holding control, the execution section 32 changes the degree of the reduction in the braking force generated to the motorcycle 1 on the basis of the gradient of the road surface. In this way, it is possible to optimize the behavior of the motorcycle 1 at the start according to the gradient of the road surface.

Preferably, in the controller 30, the output increase index value is the value that takes into account the output of the drive source (in the above example, the engine 11) of the motorcycle 1. In this way, in the case where the cancellation condition is set to the first condition, the holding control is appropriately canceled under the condition that the accelerator operation is performed by the rider. Therefore, the motorcycle 1 is appropriately started without the engine stalling.

Preferably, in the controller 30, the output increase index value is the value that takes into account the throttle opening amount of the engine 11. In this way, in the case where the cancellation condition is set to the first condition, the holding control is appropriately canceled under the condition that the accelerator operation is performed by the rider. Therefore, the motorcycle 1 is appropriately started without the engine stalling.

The present invention is not limited to the embodiment that has been described. For example, only a part of the embodiment may be implemented.

REFERENCE SIGNS LIST

1: Motorcycle
2: Front wheel
2a: Rotor
3: Rear wheel
3a: Rotor
10: Brake system
11: Engine
12: Clutch
13: Transmission
14: Hydraulic pressure control unit
14a: Base body
15: Inertial measurement unit
16: Seating sensor
17: Front-wheel rotational frequency sensor
18: Rear-wheel rotational frequency sensor
19: Clutch sensor
20: Gear position sensor
21: First brake operation section
22: Second brake operation section
30: Controller
31: Acquisition section
32: Execution section
41: Front-wheel brake mechanism
42: Rear-wheel brake mechanism
51: Master cylinder
52: Reservoir
53: Brake caliper
54: Wheel cylinder 55: Primary channel
56: Secondary channel
57: Supply channel
61: Inlet valve
62: Outlet valve
63: Accumulator
64: Pump
65: First valve
66: Second valve

The invention claimed is:

1. A controller (30) for controlling behavior of a motorcycle (1) that includes a drive source (11), a transmission (13) connected to the drive source (11) via a clutch (12), and a drive wheel (3) connected to the transmission (13), the controller configured to:
   execute holding control for braking and holding the motorcycle (1) without relying on a brake operation by a rider of the motorcycle (1) at a stop of the motorcycle (1),
   switch a cancellation condition of the holding control between a first condition, under which the holding control is canceled on a basis of an output increase index value of the drive source (11) and connection state information of the clutch (12), and a second condition, under which the holding control is canceled not on the basis of the output increase index value but on the basis of the connection state information, according to a gradient of a road surface.

2. The controller according to claim 1, wherein
the controller
switches the cancellation condition to the first condition in a case where the gradient is greater than a reference gradient, and
switches the cancellation condition to the second condition in the case where the gradient is less than the reference gradient.

3. The controller according to claim 2, wherein
the controller changes the reference gradient on the basis of at least one of occupant information and loaded article information of the motorcycle (1).

4. The controller according to claim 1, wherein
the second condition includes a condition that the connection state information is information indicating that the clutch (12) is in an engaged state.

5. The controller according to claim 1, wherein
the second condition includes a condition that the connection state information is information indicating that the clutch (12) is in a half-clutch state.

6. The controller according to claim 1, wherein
the second condition includes a condition that the transmission (13) is not in a neutral state.

7. The controller according to claim 1, wherein
when canceling the holding control, the controller changes a degree of a reduction in a braking force generated to the motorcycle (1) on the basis of the gradient.

8. The controller according to claim 1, wherein
the output increase index value is a value that takes into account output of the drive source (11).

9. The controller according to claim 1, wherein
the drive source is an engine (11), and
the output increase index value is a value that takes into account a throttle opening amount of the engine (11).

10. A control method for behavior of a motorcycle (1) that includes a drive source (11), a transmission (13) connected to the drive source (11) via a clutch (12), and a drive wheel (3) connected to the transmission (13), the control method comprising:
   executing holding control for braking and holding the motorcycle (1) by an execution section (32) of a controller (30) without relying on a brake operation by a rider of the motorcycle (1) at a stop of the motorcycle (1), wherein
   the execution section (32) switches a cancellation condition of the holding control between a first condition, under which the holding control is canceled on a basis of an output increase index value of the drive source (11) and connection state information of the clutch (12), and a second condition, under which the holding control is canceled not on the basis of the output increase index value but on the basis of the connection state information, according to a gradient of a road surface.

* * * * *